United States Patent
Mochizuki (10) Patent No.: US 7,273,303 B2
(45) Date of Patent: Sep. 25, 2007

(54) HEADLAMP FOR TWO-WHEEL VEHICLE

(75) Inventor: Shinichi Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 26 days.

(21) Appl. No.: 11/226,097

(22) Filed: Sep. 14, 2005

(65) Prior Publication Data

US 2006/0056193 A1    Mar. 16, 2006

(30) Foreign Application Priority Data

Sep. 15, 2004   (JP)   ............................. 2004-268603

(51) Int. Cl.
*B60Q 1/00*   (2006.01)
(52) U.S. Cl. ...................... 362/475; 362/517; 362/518; 362/544
(58) Field of Classification Search ................ 362/473, 362/475, 516, 517, 518, 519, 544, 548, 549, 362/249, 235, 297, 346
See application file for complete search history.

(56) References Cited

U.S. PATENT DOCUMENTS

| | | | |
|---|---|---|---|
| 4,903,173 A * | 2/1990 | Mochizuki et al. ......... | 362/544 |
| 5,353,204 A | 10/1994 | Kawamura | |
| 5,546,284 A * | 8/1996 | Harada ........................ | 362/487 |
| 6,270,241 B1 * | 8/2001 | Collot et al. ................ | 362/544 |
| 7,008,092 B2 * | 3/2006 | Tanaka et al. .............. | 362/539 |
| 2003/0174509 A1 * | 9/2003 | Futami ........................ | 362/517 |
| 2005/0141231 A1 * | 6/2005 | Takeuchi et al. ............ | 362/507 |

FOREIGN PATENT DOCUMENTS

| JP | 06-255419 | 9/1994 |
|---|---|---|
| JP | 10-255513 | 9/1998 |

\* cited by examiner

*Primary Examiner*—Thomas M. Sember
(74) *Attorney, Agent, or Firm*—Koda & Androlia (57) ABSTRACT

A two-wheel vehicle headlamp including a lamp body having a concave portion that is opened toward the front, a translucent cover that covers the front open portion of the lamp body, and a reflector which is installed inside the concave portion of the lamp body and to which light sources are attached. The headlamp further includes a light transmitting member provided along the peripheral edge portion of die reflector and between the open edge portion of the lamp body and the peripheral edge portion of the reflector, a position bulb provided in the lamp body, and a reflective portion formed in an area that substantially faces, from behind, the light transmitting member of the lamp body. Wit this structure, light of the position bulb is reflected by the reflective portion, transmitted through the light transmitting member, and radiated forward to illuminate the entire light transmitting member.

4 Claims, 7 Drawing Sheets

HEADLAMP FOR TWO-WHEEL VEHICLE

BACKGROUND OF THE INVENTION

1. Field of the Invention

The present invention relates to a headlamp for a two-wheel vehicle and more particularly to a two-wheel vehicle headlamp in which the inside of the headlamp is illuminated when the headlamp is not radiating light.

2. Description of the Related Art

Japanese Patent Application Laid-Open (Kokai) Nos. 10-255513 and 6-255419 discloses a headlamp for a vehicle in which when the headlamp is not radiating light, i.e., when neither high beam nor low-beam is not being radiated, the light source of a position lamp or a clearance lamp is lit, so that the inside of the headlamp is brightened, thus indicating the existence of the vehicle.

The vehicular headlamp disclosed in the above-described related art shows the existence of the vehicle using part of the light of the position lamp or clearance lamp; however, there is no indication of making the periphery of a reflector brightened using the reflective portion of the lamp. Therefore, the vehicular headlamp of this related art does not strongly indicate the existence of the vehicle, and thus, it is difficult to confirm the existence of the vehicle from the distance. Also, when the headlamp is viewed from the outside, only a part of the inside of the headlamp is lit brightly, giving a poor appearance.

BRIEF SUMMARY OF THE INVENTION

Accordingly, the object of the present invention is to provide a vehicular headlamp, more particularly a two-wheel vehicle headlamp, that indicates the existence of the vehicle clearly and improves the appearance of the headlamp by way of guiding light of the position bulb to the periphery of the reflector.

The above object is accomplished by a unique structure of the present invention for a two-wheel vehicle headlamp that includes:

- a light transmitting member provided along the peripheral edge portion of a reflector and between the open edge portion of the lamp body and the peripheral edge portion of the reflector,
- a position bulb provided in the lamp body, and
- a reflective portion formed in a peripheral area of the lamp body that substantially faces the light transmitting member from behind;
- so that light from the position bulb is reflected by the reflective portion, transmitted through the light transmitting member, and then radiated forward.

By this structure of the present invention, light from the position bulb is actively guided to the light transmitting member, which is provided near the periphery of the reflector, by the reflective portion of the lamp body.

More specifically, the above object is accomplished by a unique structure of the present invention for a two-wheel vehicle headlamp that includes a lamp body which has a concave portion opened to the front of the lamp, a translucent cover which covers the front open portion of the lamp body, and a reflector which is provided in the concave portion of the lamp body and to which a light source is attached; and in the present invention, the headlamp further includes:

- a light transmitting member disposed along the peripheral edge portion of the reflector and between the open edge portion of the lamp body and the peripheral edge portion of the reflector,
- a position bulb provided in the lamp body, and
- a reflective portion formed in a peripheral area of the lamp body that substantially faces the light transmitting member from behind;
- so that light from the position bulb is reflected by the reflective portion, transmitted through the light transmitting member, and radiated forward.

Accordingly, light of the position bulb is actively aimed toward the light transmitting member by the reflective portion such that the periphery of the reflector is brightly illuminated. In addition, because the light is aimed toward the light transmitting member by the reflective portion, light of the position bulb transmitting through the light transmitting member can be used effectively. Furthermore, since the reflective portion is formed in the lamp body, a space between the lamp body and the reflector can be used effectively.

Furthermore, in the headlamp of the present invention, an extension element that covers the front of an area that is between the open edge portion of the lamp body and the light transmitting member is provided. Accordingly, the inside of the lamp is not seen between the open edge portion of the lamp body and the light transmitting member, thus assuring a good appearance of the lamp.

In addition, in the headlamp of the present invention, the reflector is comprised of two sections which are arranged horizontally or vertically, a light source is attached to each of the two sections, and at least one of the position bulbs is provided in the peripheral area of the lamp body that substantially faces the light transmitting member from behind, or the at least one position bulb is provided above and below or on the left and right of a location that corresponds to a portion where the two sections of the reflector are connected. Therefore, the periphery of the two sections of the reflector can be lit evenly.

DETAILED DESCRIPTION OF THE INVENTION

Hereinafter, embodiments for implementing the headlamp for two-wheel vehicles including motorcycles according to the present invention will be described with reference to the accompanying drawings.

The headlamp 1 of the present invention is comprised of a lamp body 10, the front of which being open, a translucent cover 20 that covers the front opening of the lamp body 10, and a reflector 40 provided in a lamp space 30 which is surrounded by the lamp body 10 and the translucent cover 20.

The lamp body 10 has a concave portion 11 that is opened to the front and reflective portions 13 that are formed in the inside peripheral area of the lamp body 10. The translucent cover 20 is attached to the lamp body 10 to cover the front open portion of the concave portion 11. The translucent cover 20 is made of a material that has translucency, such as transparent plastic or hard glass, for example. The translucent cover 20 can be formed with a lens element or prism element on its inner surface for controlling the light from the light source, to be described later.

The translucent cover 20 is comprised of a gently curved front portion 21 and a peripheral portion 22 which are integrally formed. The peripheral portion 22 protrudes to the back from the peripheral edge of the front portion 21.

Figure 1:
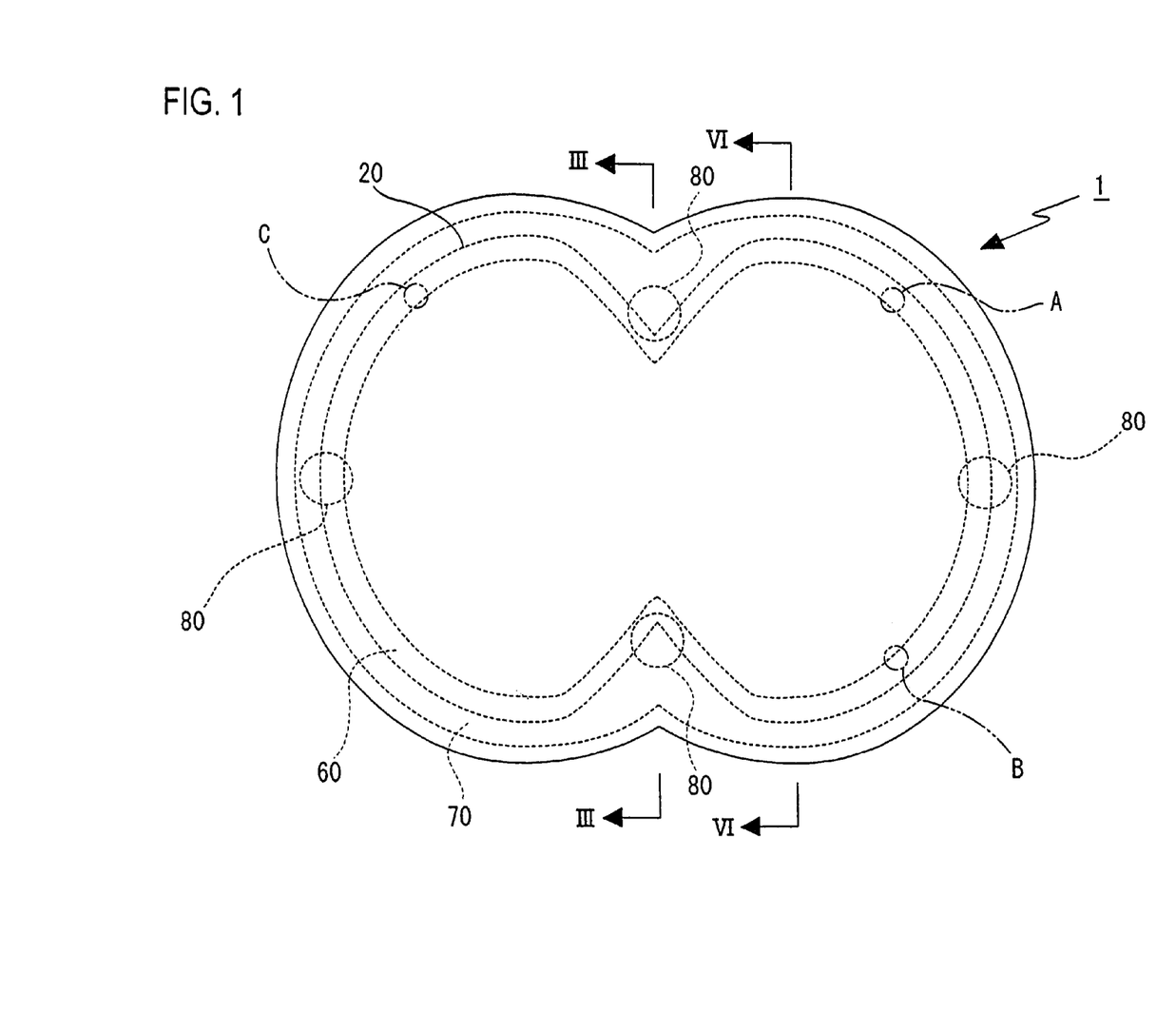
FIG. 1 is a front view of the headlamp for a two-wheel vehicle according to one embodiment of the present invention.

The reflector 40 is tiltably provided, with respect to the lamp body 10, in the lamp space 30. The reflector 40 is comprised of two bowl-shaped sections 41L, 41R, which are generally circular when viewed from the front, and disposed to be on the left and right sides or horizontally. More specifically, the reflector 40 takes such a shape that the left side section 41L, as best seen from FIG. 1, is formed so that approximately ¼ of the right side of a circle is removed, and the right side section 41R is formed so that approximately ¼ of the left side of the circle removed, and these circles are connected at the respective removed portions. Though FIG. 1 shows a horizontally arranged two sections 41L, 41R, such two sections of the reflector 40 can be provided vertically.

A light source bulb 50L, 50R is detachably attached to a portion which corresponds to the circular central portion of each section 41L, 41R of the reflector 40.

The reflector 40 is tiltably mounted in the lamp body 10 by a single turning fulcrum portion and two space adjusting portions.

The turning fulcrum portion is constructed by, for example, a sphere receiving body supported by the rear wall of the reflector 40 and a fulcrum shaft supported by the lamp body 10. A spherical body formed at the tip end of the fulcrum shaft is rotatably engaged with the sphere receiving body. Accordingly, the reflector 40 is turned about the portion where the spherical body and the sphere receiving body are engaged as a fulcrum point. On the other hand, the space adjusting portion is formed by, for example, a nut body supported by the rear wall of the reflector 40 and an adjusting shaft rotatably supported by the lamp body 10. The adjusting shaft is comprised of a threaded shaft portion and a gear portion, and a part which is between the threaded shaft portion and the gear portion is rotatably supported by the lamp body 10. The threaded shaft portion is screwed to a nut body disposed on the rear wall of the reflector 40. In the space adjusting portions, by rotating the adjusting shaft, the threaded shaft portion is screwed into or out from the nut body, depending on the direction in which it is turned. As a result, the gap between the portion of the reflector 40 which supports the nut body and the portion of the lamp body 10 which supports the adjusting shaft is adjusted.

The reflector 40 is fitted on the lamp body 10 by the turning fulcrum portion at point A shown in FIG. 1 and by the space adjusting portions at point B and point C. Therefore, for example, by rotating the adjusting shaft of the space adjusting portion at point B, the reflector 40 is turned about a line connecting the points A and C so that it tilts in the vertical direction, and by rotating the adjusting shaft of the space adjusting portion at point C, the reflector 40 is turned about a line connecting the points A and B so that it tilts in the horizontal direction.

Figure 2:
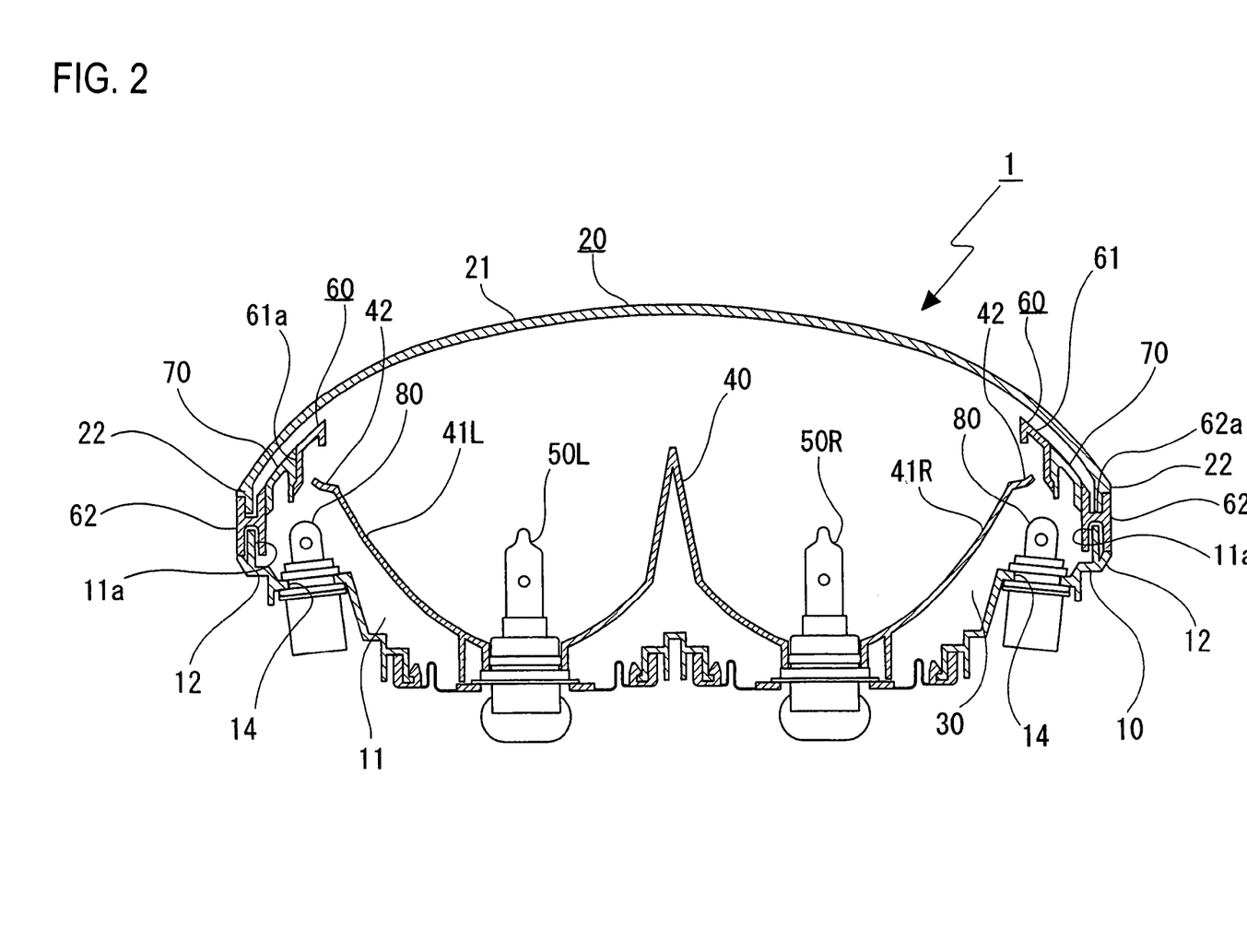
FIG. 2 is a schematic horizontal cross sectional view thereof.
Figure 3:
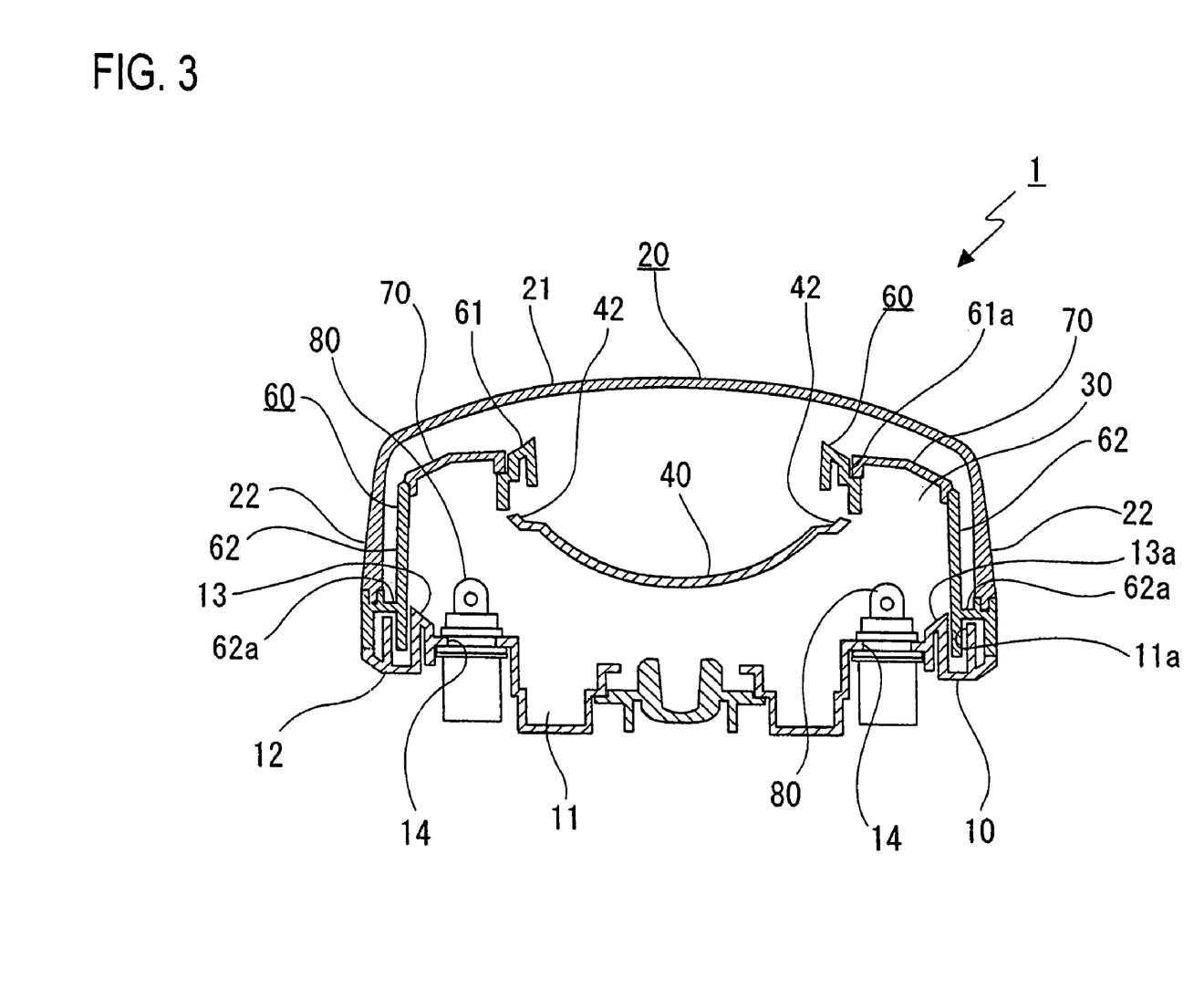
FIG. 3 is a cross sectional view taken along the line III-III in FIG. 1.
Figure 7:
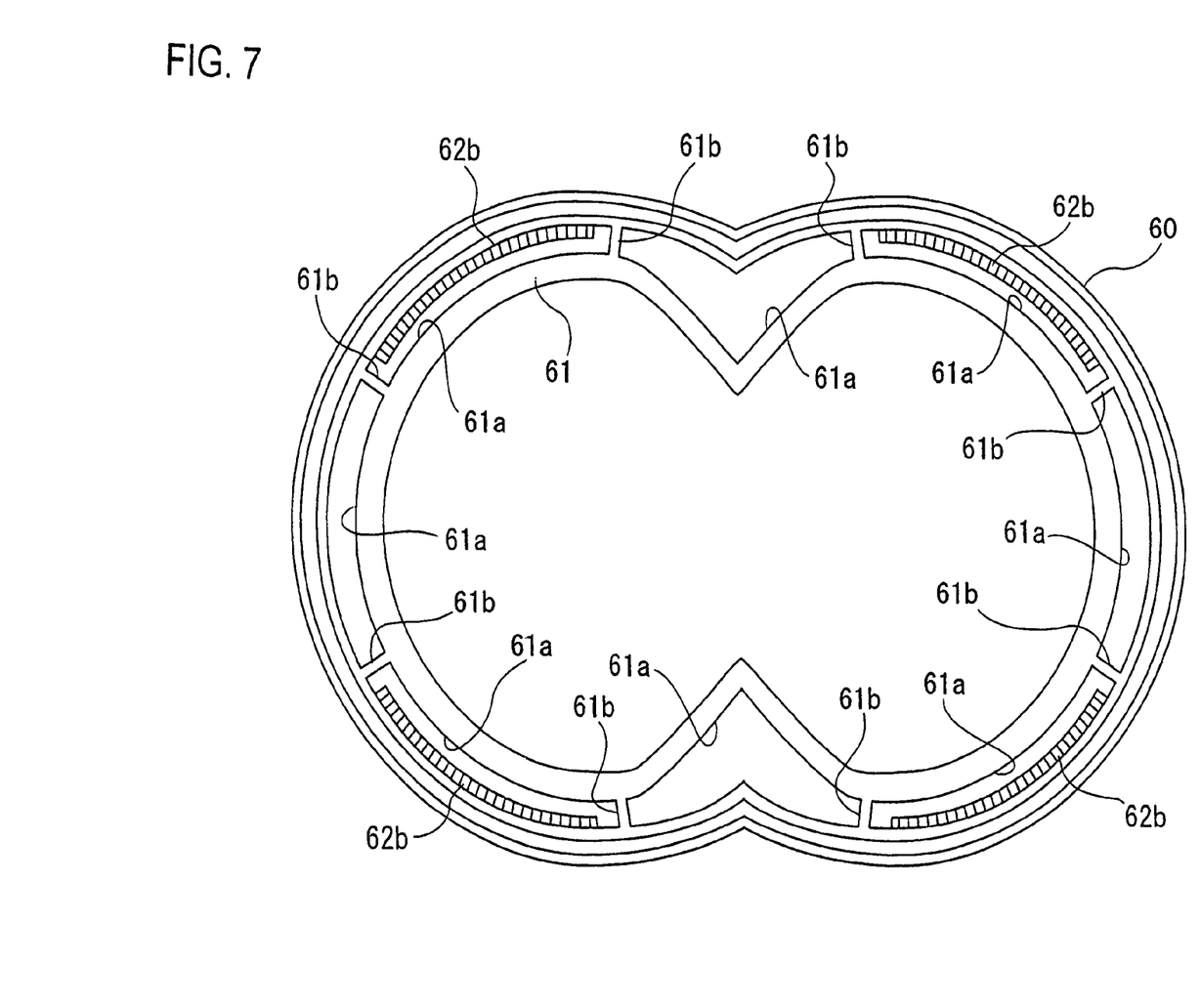
FIG. 7 is a front view of the extension element used in the headlamp of the present invention.

As seen from FIGS. 2 and 3, an extension element 60 is provided between the open edge portion 11a of the lamp body 10 and a peripheral edge portion 42 of the reflector 40. The extension element 60 is comprised of a cover portion 61 and a fitting leg portion 62 which are formed integrally. The cover portion 61 extends along the open edge portion 11a of the lamp body 10 and covers, from the front, the area between the peripheral edge portion 42 of the reflector 40 and the open edge portion 11a of the lamp body 10; and the fitting leg portion 62 extends toward the back from the outer peripheral edge of the cover portion 61. As seen from FIG. 7, transmitting openings 61a are formed in the cover portion 61 to extend substantially parallel to the peripheral edge of the reflector 40, leaving inner/outer connecting portions 61b. In addition, a joint edge 62a (see FIGS. 2 and 3) which protrudes to the outside and reflective sections 62b (see FIG. 7) which protrude to the inside are formed on the rear end portion of the fitting leg portion 62. The reflective sections 62b cover the portions of the lamp body 10 where there are no reflective portions 13. The extension element 60 is formed of an opaque material, and a surface treatment such as reflective painting, vapor deposition or the like is applied to its design surface, i.e., the surface that is visible from the outside, as necessary.

An attachment edge 12 which protrudes to the outside is formed on the open edge portion 11a of the lamp body 10, and the joint edge 62a of the extension element 60 is attached to this attachment edge 12. The rear end portion of the peripheral portion 22 of the translucent cover 20 is fixed to the joint edge 62a of the extension element 60.

A light transmitting member 70 is provided so as to cover the transmitting openings 61a formed in the cover portion 61 of the extension element 60. The light transmitting member 70 is formed of transparent material such as transparent plastic, and a light diffusing means, e.g., graining, is applied on its entire front (outer) surface or back (inner) surface.

Figure 4:
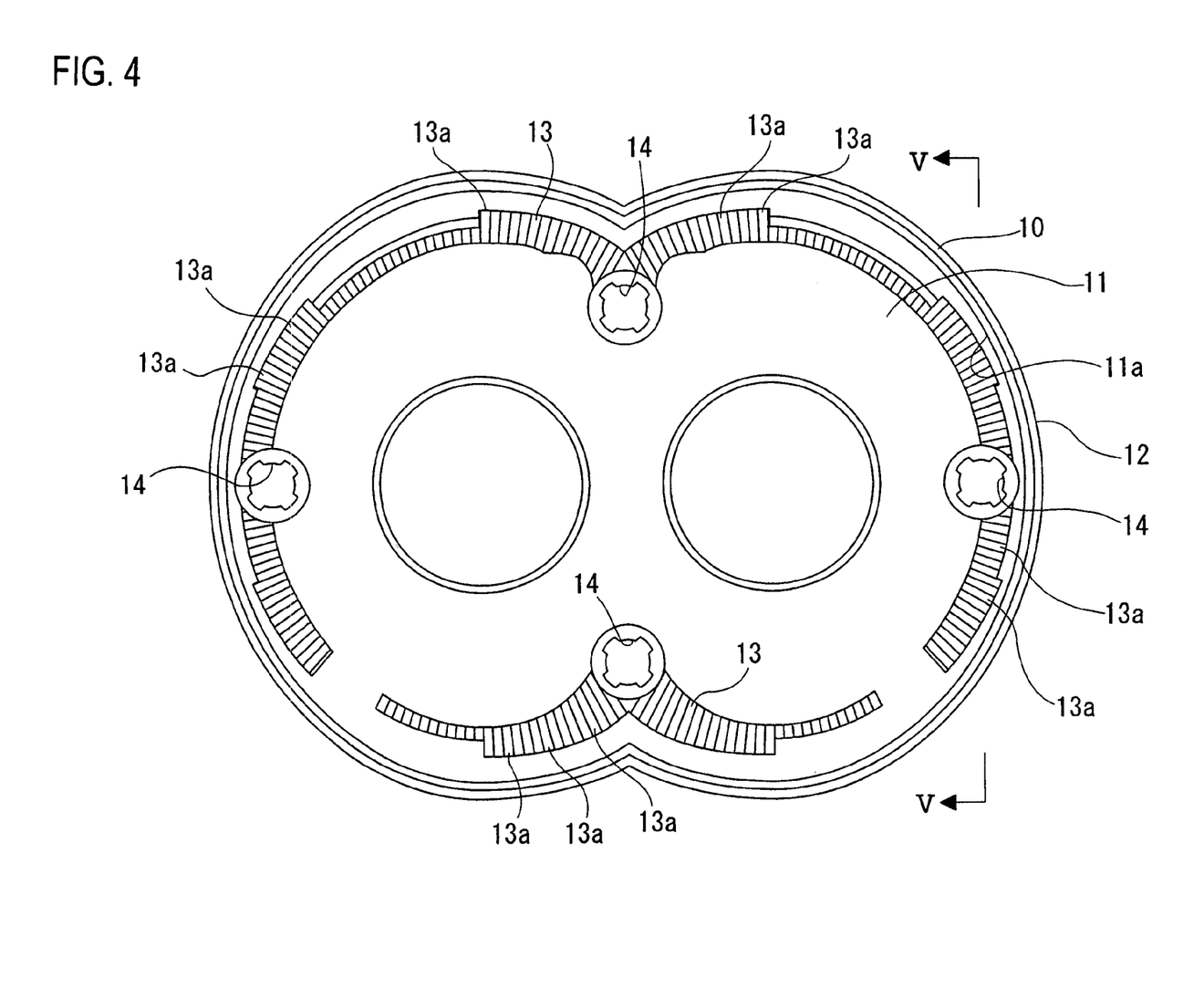
FIG. 4 is a front view of the lamp body.

The reflective portion 13 is formed in the peripheral area of the lamp body 10 that faces the light transmitting member 70 from behind or from the back. The reflective portion 13 is formed with small reflective elements 13a that, as seen from FIG. 4, extend to traverse the lengthwise direction of the reflective portion 13. The reflective elements 13a have a serrated cross-sectional shape as seen from FIG. 5.

Bulb attachment holes 14 are formed in the portion of the lamp body 10 where the reflective portion 13 is formed. In other words, the attachment holes 14 are formed in the inside peripheral area of the lamp body 10. As best seen from FIG. 4, these bulb attachment holes 14 are formed at both left and right end portions and at upper and lower positions that correspond to the portion where the two sections 41L, 41R of the reflector 40 are connected. Position bulbs 80 are detachably attached to these bulb attachment holes 14. In other words, the position bulbs 80 are located in the inside peripheral area of the lamp body 10.

Figure 5:
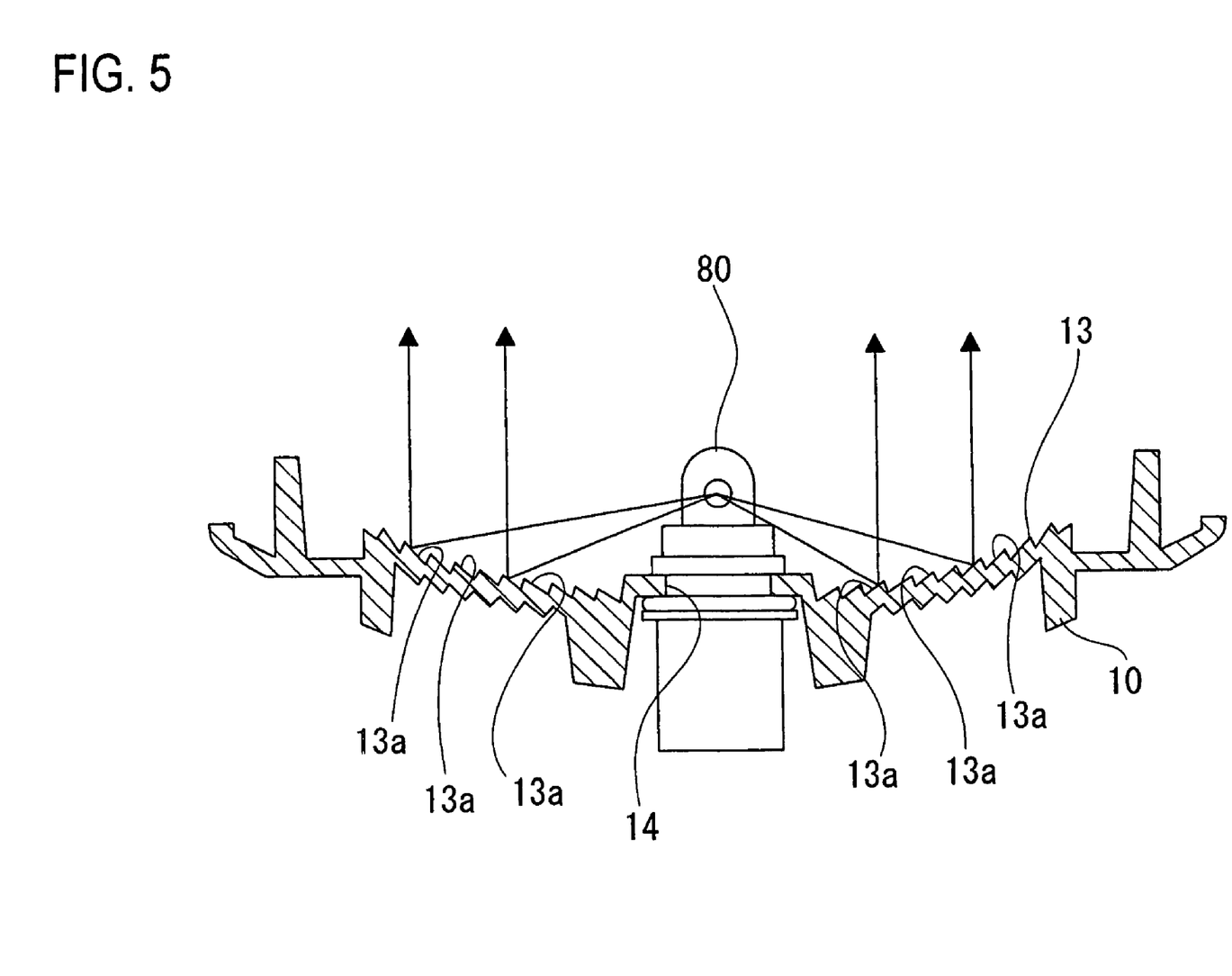
FIG. 5 is a cross sectional view taken along the line V-V in FIG. 4.
Figure 6:
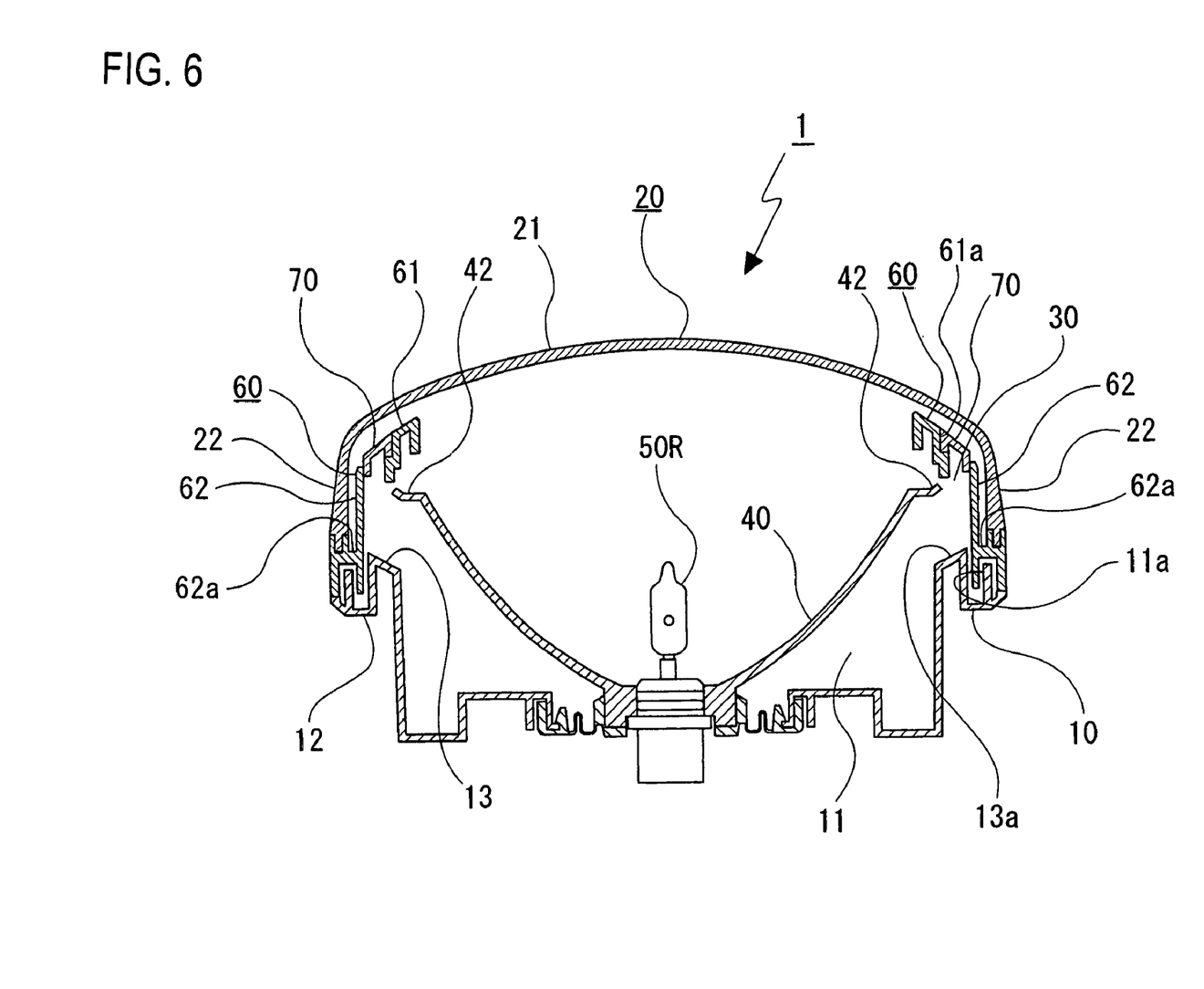
FIG. 6 is a cross sectional view taken along the line VI-VI in FIG. 1.

In the above-described headlamp 1 for two-wheel vehicles, when the light source bulbs 50L, 50R for radiating beams are not lit during driving (e.g., during daytime driving), the position bulbs 80 are lit. When the position bulbs 80 are lit, light of these position bulbs 80, as shown in FIG. 5, is reflected forward by the reflective elements 13a of the reflective portion 13, and most of that light is transmitted forward through the light transmitting member 70. Also, because the light diffusing means such as graining or the like is applied on the light transmitting member 70, light from the position bulbs 80 is diffused together with the direct light and the reflected light from the reflective portion 13 when transmitted through the light transmitting member 70. As a result, the entire light transmitting member 70, i.e., the entire area surrounding the reflector 40 appears to be lighted and the headlamp 1 is visible clearly, and thus a two-wheel vehicle on which the headlamp 1 is mounted is highly noticeable and easily recognized. When a lamp body is unable to be formed with sufficient reflective portion 13, a part of the extension element 60, e.g., a portion that faces the rear surface of the light transmitting member 70, can be formed to protrude from the fitting leg portion 62, so that a reflective portion 13 is formed on such a protruding portion.

The shape and construction of each portion and element illustrated in the foregoing embodiment and in the drawings are all no more than mere specific examples when implementing the present invention, and the technical scope of the present invention should not be limited thereby.

The invention claimed is:

1. A headlamp for a two-wheel vehicle, comprising a lamp body that has a concave portion opened to a front of the lamp, a translucent cover that covers the front open portion of the lamp body, and a reflector that is provided in the concave portion of the lamp body and to which a light source is attached, said headlamp further comprising:
   an extension element provided along a peripheral edge portion of the reflector and between an open edge portion of the lamp body and the peripheral edge portion of the reflector, said extension element comprising a cover portion that extend along the open edge portion of the lamp body and covers, from the front, the are between the peripheral edge portion of the reflector and the open edge portion of the lamp body;
   a position bulb provided in the lamp body;
   a light transmitting member provided so as to cover transmitting openings formed in the cover portion of the extension element; and
   a reflective portion formed in a peripheral area of the lamp body which substantially faces the light transmitting member from behind;
   wherein light from the position bulb is reflected by the reflective portion, transmitted through the light transmitting member, and radiated forward; and
   whereby the entire light transmitting member appears to be lighted and the headlamp is visible clearly.

2. The headlamp for a two-wheel vehicle according to claim 1, wherein
   said reflector is comprised of two sections with said light source being provided in each of said two sections; and
   at least one of said position bulbs is provided in said peripheral area of said lamp body so as to face said light transmitting member from behind.

3. The headlamp for a two-wheel vehicle according to claim 2, wherein said two sections of the reflector are disposed horizontally.

4. The headlamp for a two-wheel vehicle according to claim 2, wherein said two sections of the reflector are disposed vertically.

* * * * *